United States Patent
Gorringe

(12) 
(10) Patent No.: US 6,349,949 B1
(45) Date of Patent: Feb. 26, 2002

(54) BABY STROLLER HARNESS FOR JOGGERS

(76) Inventor: Kristin S. Gorringe, 8230 N. Loch Haven Dr., #6, Hayden, ID (US) 83835

(*) Notice: Subject to any disclaimer, the term of this patent is extended or adjusted under 35 U.S.C. 154(b) by 0 days.

(21) Appl. No.: 09/337,383

(22) Filed: Jun. 21, 1999

(51) Int. Cl.$^7$ .................................................. B62B 7/04
(52) U.S. Cl. .................. 280/1.5; 280/47.38; 280/288.4; 280/293
(58) Field of Search ...................... 280/727, 1.5, 47.38, 280/DIG. 6, 62, 288.4, 293; 403/DIG. 4, 191, 192, 332

(56) References Cited

U.S. PATENT DOCUMENTS

| | | | | |
|---|---|---|---|---|
| 4,236,723 A | * | 12/1980 | Lemmon | 280/1.5 |
| 4,484,832 A | * | 11/1984 | Weissenberger | 403/191 |
| 5,215,355 A | * | 6/1993 | Klumpjan | 298/6 |
| 5,653,455 A | * | 8/1997 | Richards | 280/19 |
| 6,027,001 A | * | 2/2000 | Levitan | 224/184 |
| 6,098,993 A | * | 8/2000 | Bellinson | 280/1.5 |

* cited by examiner

Primary Examiner—Brian L Johnson
Assistant Examiner—Deanna Draper
(74) Attorney, Agent, or Firm—Keith S. Bergman

(57) ABSTRACT

A harness to interconnect an operator with a baby stroller for hands-free propulsion and control of the stroller provides two similar spaced connecting arms each having vehicle connectors at first ends to releasably attach to a stroller and rod caps at second ends to releasably attach to belt connectors carried by a belt releasably positionable about the operator's waist. The vehicle connectors are releasably fastenable in spaced positions about either horizontal or vertical structural elements of the baby stroller. The belt connectors are fixedly attached in spaced relationship to the belt. The joinder of the connecting arms to the vehicle connectors at the first ends may be articulating for motion primarily in a vertical plane to accommodate operator motion while maintaining steerage control for the stroller and the belt connectors may accommodate operator motion by resilient deformation or loose positioning of the belt about the operator.

7 Claims, 2 Drawing Sheets

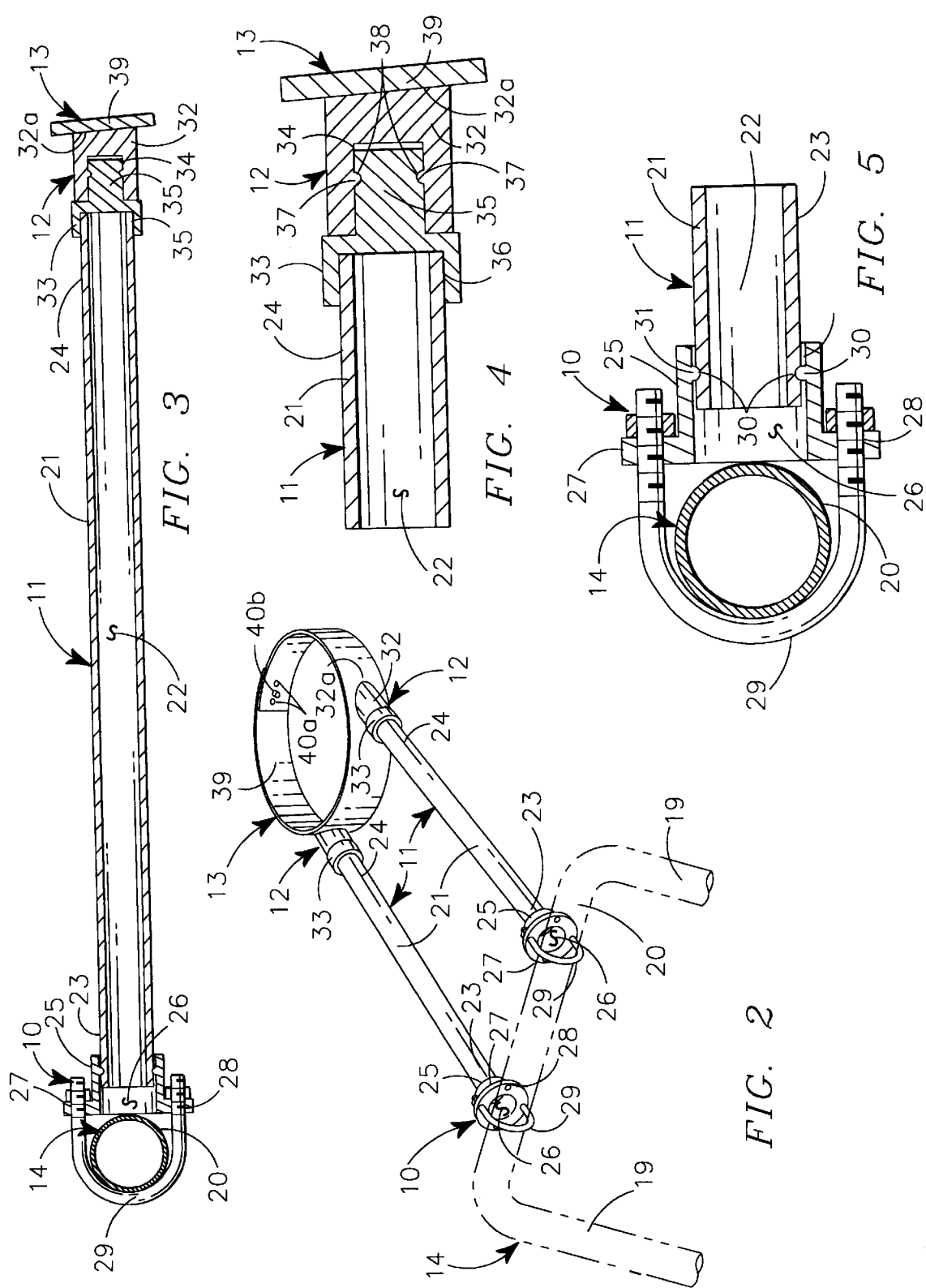

BABY STROLLER HARNESS FOR JOGGERS

BACKGROUND OF INVENTION

RELATED APPLICATIONS

There are no applications related hereto heretofore filed in this or any foreign country.

FIELD OF INVENTION

My invention relates generally to child carriage vehicles and more particularly to a harness to interconnect such a vehicle with a jogger for hands-free operation.

BACKGROUND AND DESCRIPTION OF PRIOR ART

Wheeled vehicles for the transport of children have long been known and in their historical course of development have become quite sophisticated and often specialized for particular uses. In the present day with a general cultural increase in walking, jogging and running activities for exercise and other purposes, various child carriage vehicles and ancillary apparatus have become known and adapted for use in such ambulatory activities. Though such vehicles and ancillary apparatus developmentally have reached some degree of sophistication, problems still remain with them and their use. The instant invention seeks to resolve or alleviate various of these remaining problems.

The many and various vehicles of diverse configurations for the support and transport of children generally, and babies and infants in particular, that have heretofore become known have provided from one to four or more wheels for locomotion and varying frame and body structures, often specifically designed for particular purposes, but all by reason of their nature, have provided some type of manipulative structure for either gripping or interconnection with a user to provide means for motion and control by the user. Most such vehicles provide a handle-like structure having at least one elongate, horizontal or vertical grasping or support element projecting from the primary structure, usually rearwardly, for convenient user access and manipulation. It is with this type of child carriage vehicle that my invention is concerned in providing a substantially universally usable harness to interconnect such a vehicle and a user to allow manipulation for vehicle motion and control without requiring the use of the operator's hands.

Various interconnecting devices have heretofore become known for interconnecting an operator and a child carriage vehicle, but most have been designed for use with particular vehicles, either by being permanently attached to the vehicle or having specially configured structures for attachment to particularly configured vehicle parts. The instant harness in contradistinction provides plural attachment arms with connectors that may be releasably attached to structural elements of child vehicles of either horizontal, vertical or angulated orientation and varying sizes to allow use with a wide variety of child carriage vehicles with or without traditional handle structures as such. The connectors further provide all structure necessary for releasable connection with a child carriage vehicle and require no specialized structure or modification of the vehicle to make such connection.

For safety of both a child occupant and the operator of a child carriage vehicle, it heretofore has generally been found desirable to provide an automatically releasable interconnection between the vehicle and the operator to reduce or prevent injuries in the event of accidents. The instant harness resolves this problem simply and inexpensively by providing similar spaced elongate connecting arms with vehicle connectors at first ends and operator connectors at second ends, either of which may be slidably carried on the support arms for positional maintenance by frictional engagement, deformation of resilient detent structures or both to allow regulation of the force required to disconnect the elements.

For any child carriage vehicle harness to be practically effective, it must provide some degree of control of the locomotion of the child carriage vehicle without materially affecting the other requirements for such harness. Various known harness type devices have developed some measure of such control, but often not to the degree required or at the expense of other required vehicle functions. The instant harness provides two similar spaced connecting arms that at first ends are attachable to a vehicle at spaced positions and at second ends are attached to an operator belt at spaced positions to provide leverage between the connection points at both the first and second ends to provide substantial and finely regulatable control of the child carriage vehicle by simple and easily exerted body twisting type motions of the operator. This structure is distinguished from prior devices that have not provided interconnection at two spaced points at each end of connecting devices for manipulative leverage or that have not provided releasable control structures that are easily released by normal control type motions of a user.

For a child carriage vehicle harness to be practically usable by walking, jogging or running vehicle operators, the harness structure must articulate sufficiently to allow the normal motions of the manipulator's activity while not substantially lessening or destroying any of the other functional requirements of the harness. Various prior harnesses have made provision for user motion, but often this has been at the expense of other functions, especially such as control or emergency release of the child carriage vehicle from the operator. The instant harness resolves this problem by providing synergistic articulating motion at both ends of each harness support rod relative to the structure that interconnects with those ends. The ordinary and habitual motion of the user's body, at its waist portion where the harness belt is positioned, in ambulating or jogging is substantially vertically oriented, so the instant articulation allows motion primarily in a vertical plane to accommodate the required body motion, but yet maintains vehicle control by reason of the lesser potential for motion in any direction other than in a vertical plane.

My invention lies not in any one of these features individually, but rather in the synergistic combination of all of its structures that necessarily give rise to the functions flowing therefrom as herein set forth and claimed.

SUMMARY OF INVENTION

My child carriage vehicle harness provides two elongate rigid connecting arms each carrying vehicle connectors at their first ends. The second ends of the connecting arms are carried in similar belt connectors structurally supported on an operator belt that is releasably carried about an operator's waist. The vehicle connectors have releasable fasteners to extend about a handle or other structural elements of the vehicle for positional maintenance that is optionally pivotal. The belt connectors provide resiliently deformable structures to allow limited angulated motion of the connecting arm carried therein, principally in a vertical plane. The interconnection of the connecting arms with both the vehicle connectors and belt connectors may be releasable upon application of predetermined separating force.

In providing such a device, it is:

A principal object to provide a harness to interconnect a child carriage vehicle with an operator to allow locomotion and control of the vehicle during ambulatory activities of an operator without requiring use of the operator's hands.

A further object is to provide such a harness having two spaced connecting arms that are releasably attachable at first ends to a child carriage vehicle at spaced points and at second ends are carried at spaced positions by an operator belt to provide leverage for vehicle control by twisting motion of the waist portion of a user's body.

A further object is to provide such a harness wherein the connecting arms carry optionally releasable vehicle connectors at their first ends and optionally releasable belt connectors at their second ends so that the connector arms may be released from supporting structures by axially oriented forces of predetermined strength resulting from accidental happenings.

A still further object is to provide such a harness that has vehicle connectors with releasable connecting elements that may be fastened about portions of a vehicle handle or frame that are orientated in vertical, horizontal or angulated array.

A still further object is to provide such a harness that optionally has connectors of such nature that allow connecting arms to move primarily in a vertical plane while restraining motion in a horizontal plane to accommodate normal walking, jogging or running motion of a user while maintaining a user's control of vehicle course of motion.

A still further object is to provide such a harness that is of new and novel design, of rugged and durable nature, of simple and economic manufacture and one that is otherwise well suited to the uses and purposes for which it is intended.

Other and further objects of my invention will appear from the following specification and accompanying drawings which form a part hereof. In carrying out the objects of my invention, however, it is to be understood that its features are susceptible of change in design and structural arrangement, with only one preferred and practical embodiment being described in the accompanying specification and illustrated in the accompanying drawings, as is required.

BRIEF DESCRIPTION OF DRAWINGS

In the accompanying drawings which form a part hereof and wherein like numbers of reference refer to similar parts throughout:

FIG. 2 is an isometric view of my child vehicle harness isolated from a user and interconnected to a child carriage vehicle handle shown in phantom outline.

FIG. 3 a is a vertical cross-sectional view through one of the connecting arms of the harness of FIG. 1, taken on the line 3—3 thereon in the direction indicated by the arrows.

FIG. 4 is an enlarged portion of the left vehicle connector end structure of the cross-sectional view of FIG. 3.

FIG. 5 is an enlarged portion of the right operator belt connector end structure of the cross-sectional view of FIG. 3.

DESCRIPTION OF THE PREFERRED EMBODIMENT

Figure 1:
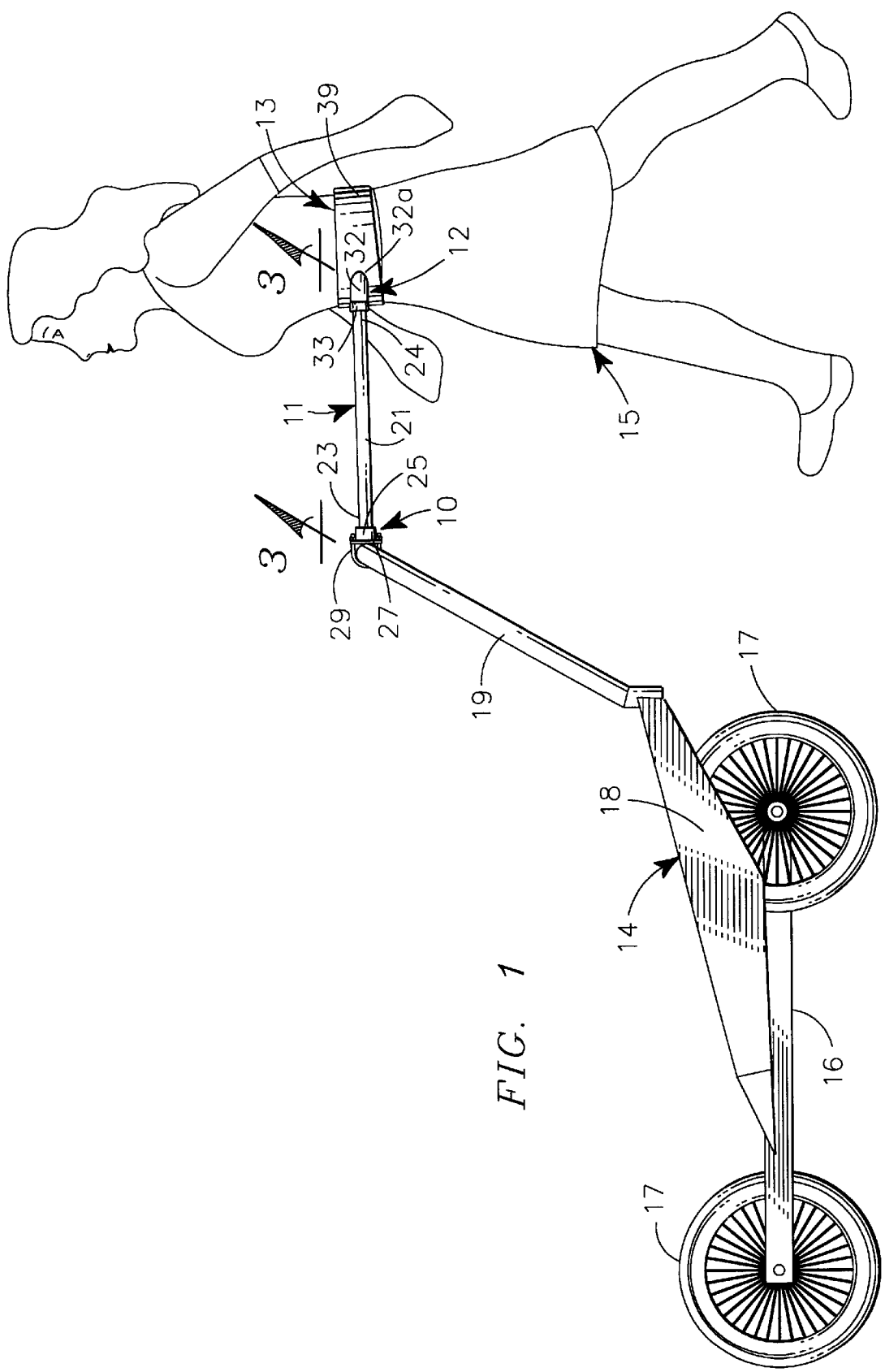
FIG. 1 is an orthographic side view of my harness showing its use in interconnecting a child carriage vehicle with an operator

My invention generally provides a harness having spaced connecting arms 11 with vehicle connectors 10 at each first end to interconnect with a child carriage vehicle 14, and belt connectors 12 at each second end interconnected with operator belt 13 positionable about the waist of operator 15.

Child carriage vehicle 14 of a type with which my invention may be used is illustrated in a modern generic form in FIG. 1. This vehicle will hereinafter for convenience, and not by way of limitation but in keeping with modern semantics, be referred to as a baby stroller. All such baby strollers of the type illustrated in FIG. 1 in their essence have a platform type frame 16 mounting one or more depending wheels 17 for locomotion and carrying superstructure 18 for child support, but these essential elements in detail often present many and various particularized configurations. Commonly in the present day for use by walkers, joggers or runners, such strollers provide a relatively low and flat type of frame to provide a lower center of gravity for the vehicle and they usually are supported by two or three relatively spaced wheels of larger diameter to aid locomotion over rough and irregular terrain. Superstructure for support and positional maintenance of a child normally also has a quite low and flat profile, again to provide a low center of gravity for greater safety. The illustrative description of such type of baby stroller is only to aid description, however, and is not intended to be limiting, as my harness is generally equally usable with older designs of baby strollers with smaller wheels, higher frames higher centers of gravity and other varying configurations.

All such baby strollers provide some means for grasping by or attachment to an operator so that they may be powered by the operator for locomotion and controlled as to the course of motion. In the instance illustrated, the manipulating means comprises a rearwardly extending U-shape handle defined by spacedly opposed legs 19 interconnected by upper rearwardmost horizontal handle bar 20. The legs 19 in the illustrated instance are structurally carried by superstructure 18 to extend in upwardly and rearwardly angulated orientation, though such handle structure also commonly is supported on frame 16 or some extension thereof with or without angulation and may also extend forwardly.

Though the U-shaped handle illustrated is the most common form of manipulative structure, various other configurations of this essential structure are known and are operative with my harness. Every baby stroller, however, provides some type of a manipulatable structure for operability and almost universally such structures provide one or more elongate elements of either generally horizontal or generally vertical orientation that are comparable to the legs 19 or the handle 20 illustrated. It is with this type of baby stroller that my harness is operative.

Vehicle connectors 10 provide two similar elongate tubular rods 21 each defining medial channels 22. The required characteristic of these connecting arms is that they provide a relatively light rigid interconnection between the baby stroller 14 and operator 15. Their configuration and dimension are otherwise not critical, though the preferred embodiment for manufacturing facility and economy is a cylindrical tubular structure having a diameter of approximately one inch and a variable length generally ranging from one to four feet for practical operability and necessary strength, rigidity and durability The first end 23 and second end 24 of each rod 21 are generally, but not necessarily, perpendicular to the axis of the rods.

Vehicle connectors 10 are carried at the first ends 23 of each tubular rod 21. Each vehicle connector 10 provides cylindrical collar 25 defining medial channel 26 of such diameter as to receive and fit about the first end portion 23 of the associated tubular rod 21 with some frictional engagement. The outer or vehicle facing end of collar 25 defines diametrically larger annular fastening rim 27 extending substantially perpendicularly from the collar. The fastening rim 27 defines four quadrantally arrayed fastening holes 28 arrayed in horizontally and vertically paired orientation. One diametrically opposed pair of fastening holes 28 of each fastening rim 27 carry fastener 29, in the instance illustrated comprising a U-bolt with threadedly engaged nuts an each leg, inwardly of rim 27, to fasten the collar 25 on handle bar 20 of a baby stroller when that handle be positioned between the U-bolt and collar. The fastener 29 may take other known forms than that of a U-bolt, such as a fastenable strap, band or the like, and those variations are within the ambit and scope of my invention so long as they accomplish the specified functions.

The interconnection of collars 25 with the associated rods 21 may be releasable or non-releasable. If non-releasable, the interconnection preferably is accomplished by adhesion, welding, threading, riveting or other similar known mechanical means appropriate to the materials involved. If releasable, the interconnection preferably is accomplished by resilient deformation of the elements and cooperating detents and protuberances, as illustrated, with one or more protuberances 30 defined on the inner surface of collar 25 defining channel 26 in cooperating relationship with a similar number of indentations 31 defined in the external surface of the first end portion of rod 21 This interconnection may also be accomplished by direct frictional engagement of the two adjacent surfaces, especially if at least one surface is slightly tapered to increase the friction of the engagement, but the indentation and protuberance type connection provides better control to allow predetermination of the force necessary to provide release between the elements.

If required, the first end portions 23 of rods 21 may be slit, as heretofore known and not shown, to provide relief to aid resilient deformation of the rod for attachment of the vehicle connector elements.

Belt connectors 12 each provide outer collars 32 releasably interconnecting rod caps 33 carried by the second end portions 24 of each connecting arm rod 21. The belt end 32a of each collar 32 is appropriately angulated for conformable structural carriage on operator belt 13. Each collar 32 defines in its forward connector rod end cylindrical chamber 34 to receive the outer end portion 35 of rod cap 33, preferably in a releasable frictional fit. The forward end portion of rod cap 33 defines medial cylindrical channel 36 to receive and structurally carry the second end portion 24 of a rod 21. The structural interconnection of rod 21 within rod caps 33 is accomplished by welding, adhesion, riveting, threading or like fastening appropriate to the materials involved.

Preferably the engagement of the second end portions 35 of rod caps 33 in collar chambers 34 is enhanced by protuberances 37 defined on the surface of outer collar 32 that defines chamber 34 and cooperatingly arrayed indentations 38 defined in the adjacent internal surface of outer end portion 35 of the rod cap 33. This fastening also may be of a fixed structural nature by joinder by known methods or may be entirely frictional between the adjacent surfaces of the two elements. All such Joinders remain within the spirit and scope of my invention, but the protuberance and indentation joinder again provides better predetermined control of forces required for dislodgement of the connection.

Operator belt 13 provides elongate flexible or resiliently deformable band 39 having interconnectable ends that are releasably fastened to each other by fastener 40 to form a continuous closed hand in the nature of a belt. The band is of such dimension as to provide a comfortable fit about the waist of a user, though its dimensions in either width or length are not critical so long as they fulfill this purpose. The fastener 40 in the instance illustrated comprise a plurality of spacedly arrayed holes 40a defined in one end portion of the band 39 to receive fastening post 40b carried by the adjacent surface of the other end portion of the band to provide a releasable interconnection. This particular type of fastening structure is not critical and other known belt fasteners adaptable to use with the materials of a particular band may be used and are within the general ambit and scope of my harness.

The band must be of such nature as to allow structural interconnection of belt connectors 12 when their end portions 32a are configured to conformably fit adjacent to the outer surface of the band when it is in a fastened condition defining a closed curve. This interconnection may be accomplished by known means appropriate for the material involved, such as adhesion, welding, riveting, unitary formation or the like.

The materials from which my harness members are formed are not critical so long as they meet the physical parameters specified. Preferably the entire structure is formed from polymeric or resinous plastic material because of the desired physical characteristics of resilient deformability, rigidity, economy and ease of manufacture. Other materials, however, having the specified characteristics of the various elements may be used and are within the ambit and scope of my invention.

Having described the structure of my harness, its operation and use may be understood.

A harness formed according to the foregoing specification is assembled as described and illustrated. The vehicle connectors 10 at the first ends of each connecting arm 11 are fastened to some part of the structure of baby stroller 14, in the instance illustrated to the horizontal handle bar 20 of the manipulating structure. This fastening is accomplished by removing the U-bolt fasteners 29 to allow insertion of the handle bar therein between the U-bolt nuts and associated collar 25, with subsequent replacement and fastening of the U-bolt with the handle in this position.

The operator belt 13 then is opened and the operator 15 moves to a position such that the belt may be established about the operator's waist. The belt then is fastened about the operator's waist, with the connecting arms extending to releasably interconnect the operator and the baby stroller 14 as illustrated in FIG. 1. If desired and the interconnections at either end of the connecting arms are releasable, the connecting arms may be released, the belt established on a user and the connecting arms subsequently replaced in the connectors from which they were removed. This latter procedure may be somewhat more difficult and clumsy of execution than leaving the connectors attached to the belt when establishing the belt about the waist of the user.

In operation, the user merely proceeds in a forward direction toward the baby stroller by walking, jogging or running in normal fashion. As this occurs, the stroller will be maintained spacedly forwardly of the user by the connecting arms 11 and will be responsively moved over the surface supporting it by operation of its wheels. As the user moves vertically in the course of his or her ambulatory motion, the vertical motion will be accommodated by the articulating linkage provided by the vehicle connectors 10 and belt connectors 12. The U-bolt fasteners 29 may be maintained in a loosely fastened condition to allow pivotal motion in a vertical plane about the horizontally orientated handle element of the stroller manipulative structure if desired. The belt connectors may be designed to provide resilient deformation and the band 39 may be loosely maintained about a user's waist to allow limited vertical motion of the outer end portions of the harness.

It is to be noted in using my stroller harness that either or both of vehicle connectors 10 may be interconnected to various portions, other than those illustrated, of either horizontally or vertically oriented structural element of the baby stroller, such as one or both legs 19 of the manipulative structure, the axle of one or more wheels, a frame member, or the like.

It is further to be noted that operator belt 13 may be positioned on an operator with the connecting arms 11 extending rearwardly rather than forwardly, and with the baby stroller behind rather than in front of the operator. In this mode the baby stroller would be pulled rather than pushed, though its locomotive operation would be substantially the same as with the baby stroller in front of the operator.

The foregoing description of my invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described my invention, what I desire to protect by letters patent, and

What I claim is:

1. In a Harness to interconnect an operator and a child carriage vehicle, having a frame supporting at least one depending wheel for locomotion, an upstanding superstructure for carriage of a child and manipulative structure extending from the vehicle for access by an operator standing rearwardly of the vehicle, for propulsion and control without use of the operator's hands, the invention comprising, in combination:

two similar elongate connecting arms having first forward and second rearward ends, with vehicle connectors carried at the first forward ends and belt connectors carried at the second rearward ends, each of said vehicle connectors having a cylindrical collar defining a medial channel for carriage of the first end portion of the associated connecting arm and defining a radially outwardly extending flange at a first end distal from the associated connecting rod, said flange defining at least two diametrically opposed holes carrying a U-bolt extending therethrough with nuts on the U-bolt to releasably interconnect the manipulative structure of the child carriage vehicle for relative pivotal motion only in a vertical plane, and each of said belt connectors structurally carried by an operator belt having means for releasable positioning and maintenance about the waist of an operator, spacedly rearward of the manipulative structure, to allow steerage of the child carriage vehicle responsive to motion of the waist of the operator.

2. The harness of claim 1 further characterized by each of the vehicle connectors defining a channel having means to fastenably receive the first end portion of the associated connecting arm in a substantially adjacent, releasable interconnection requiring predetermined force for release.

3. The harness of claim 2 further characterized by the adjacent surfaces of the vehicle connector and associated connecting arm defining, respectively, at least one set of a protuberance and an opposed cooperating indentation that releasably interconnect the vehicle connector and the connecting arm.

4. In a harness to interconnect an operator and a child carriage vehicle, having a frame supporting at least one depending wheel for locomotion, an upstanding superstructure for carriage of a child and manipulative structure extending from the vehicle for access by an operator standing rearwardly of the vehicle, for propulsion and control without use of the operator's hands, the invention comprising, in combination:

two similar elongate connecting arms having first forward and second rearward ends, with vehicle connectors carried at the first forward ends and belt connectors carried at the second rearward ends, each of said vehicle connectors having fastening means to releasably interconnect the manipulative structure of the child carriage vehicle for relative pivotal motion only in a vertical plane, and each of said belt connectors structurally carried by an operator belt having means for releasable positioning and maintenance about the waist of an operator spacedly rearward of the manipulative structure to allow steerage of the child carriage vehicle responsive to motion of the waist of the operator, and each belt connector comprising a collar defining a chamber in a first end distal from the belt carrying the collar, and the second end portion of the associated connecting arm carrying a rod cap having an end portion extending from the connecting arm configured to releasably interconnect in substantial adjacency within the chamber defined by the collar in a connection that requires a predetermined force for disengagement.

5. The belt connector of claim 4 wherein the adjacent surfaces of the rod cap and the belt connector chamber, respectively, define one element of a set of a protuberance and an opposed cooperating indentation that releasably interconnect the rod cap and belt connector.

6. A harness to interconnect an operator and child carriage vehicle, having a frame supporting at least one depending wheel for locomotion, an upstanding super structure for carriage of a child and a manipulative structure extending from the vehicle for access by a standing operator, for vehicle propulsion and control without use of the operator's hands, comprising in combination:

a rearward operator belt, having means for releasable position and maintenance about the waist of an operator, structurally supporting two spaced belt connectors having a collar extending spacedly forward from the operator belt and defining a chamber in the forward portion of the collar distal from the belt to receive a connecting arm rod cap;

similar rigid elongate connecting arms having first and second ends with rod caps at each second end, each rod cap defining an outer portion extending from the associated connecting arm to fit in releasable engagement within the chamber defined by the associated belt connector; and vehicle connectors carried at the first end portion of each connecting arm, each vehicle connector having a collar defining a medial channel to receive the first end portion of the associated connecting arm in releaseable engagement requiring a predetermined force for disengagement, and an annular fastening rim at its end portion distal from the associated connecting arm, said fastening rim defining at least one pair of diametrically opposed holes carrying a U-bolt to releasably interconnect the manipulative structure of a child carriage vehicle for relative pivotal motion only in a vertical plane.

7. The harness of claim 6 wherein at least one of the belt connectors fixedly carries the end portion of the associated connecting arm.

* * * * *